United States Patent [19]
Guillet et al.

[11] Patent Number: 6,005,027
[45] Date of Patent: Dec. 21, 1999

[54] STABLE SILANE COMPOSITIONS ON SILICA CARRIER

[75] Inventors: Antoine Guillet, Divonne-les-Bains, France; Remy Gauthier, Aire, Switzerland

[73] Assignee: Witco Corporation, Greenwich, Conn.

[21] Appl. No.: 08/696,583

[22] Filed: Aug. 16, 1996

Related U.S. Application Data

[60] Provisional application No. 60/002,778, Aug. 16, 1995.

[51] Int. Cl.$^6$ .............................. C08K 9/00; C08K 9/06; C08K 3/00; C04B 14/04
[52] U.S. Cl. ...................... 523/209; 523/216; 523/214; 524/847; 106/490
[58] Field of Search ................................ 523/209, 216, 523/214; 524/847; 106/490

[56] References Cited

U.S. PATENT DOCUMENTS

| | | |
|---|---|---|
| 4,590,052 | 5/1986 | Chevallier et al. . |
| 5,112,885 | 5/1992 | Inoue et al. . |
| 5,116,886 | 5/1992 | Wolff et al. . |
| 5,213,899 | 5/1993 | Lucas . |
| 5,221,651 | 6/1993 | Sacchetti et al. . |
| 5,236,962 | 8/1993 | Govoni et al. . |

FOREIGN PATENT DOCUMENTS

| | | |
|---|---|---|
| 0157703 | 10/1985 | European Pat. Off. . |
| 0468140 | 4/1991 | European Pat. Off. . |
| 0459208 | 12/1991 | European Pat. Off. . |
| 0520862 | 12/1992 | European Pat. Off. . |
| 2747277 | 10/1977 | Germany . |

OTHER PUBLICATIONS

Chemistry of Pigments and Fillers by Wyley Jun. 1983.
Silquest A–1289 Silane (For Rubber and Elastomers), Aug. 1989.
Acid–Based Interaction pp. 117–134 "Characterization of the acid–base nature of metal oxides by adsorption of TCNQ" by Kenjiro Meguro & Kunio Esumi, Feb. 1990.

*Primary Examiner*—Paul F. Shaver
*Attorney, Agent, or Firm*—Edward K. Welch, II; Andrew S. Reiskind; Timothy X. Witkowski

[57] ABSTRACT

The present invention discloses blends of silanes and specific silicas, characterized in that when the blend is compounded into a rubber formulation even after 4 months of storage following formation of the blend, an unexpectedly high proportion of the silane present is available as a coupling and reinforcing agent for the rubber formulation. Over 80% and even over 90% of the silica can be extracted or described from the blend even 4 months after formation of the blend, and rubber formulation properties indicate high availability of the silane for coupling and reinforcement.

64 Claims, No Drawings

STABLE SILANE COMPOSITIONS ON SILICA CARRIER

REFERENCE TO RELATED APPLICATIONS

This application claims the benefit of U.S. Provisional application Ser. No. 60/002,778, filed Aug. 16, 1995.

BACKGROUND OF THE INVENTION

Organofunctional silanes are a class of dual-functional chemicals that are characterized by their ability to react with mineral surfaces like glass, silica, silicates, alumina, metallic surfaces and more generally, surfaces with strong polarity. They can also react with or compatibilize organic materials like plastics, rubber, coatings and resins. Such silanes are used in filled and reinforced materials where their ability to react with both the filler or reinforcement and the organic matrix provides enhanced adhesion and improved physical properties. In such uses they are often called "coupling agents". Most such silanes are liquids.

Silane masterbatches (solid silane concentrates, i.e., dry or powder from silane) have been used for many years in applications where it is desirable to add the silane as a solid. The masterbatches are usually based on a porous solid carrier with high adsorption capacity and carry up to 75% liquid silane. For economic reasons, it is desirable to adsorb as much silane as possible because the carrier usually has no other function than to carry the silane, and then release it essentially completely into the compound during processing, and is selected for its absence of reactivity with the polymers and with the silanes (which reactivity could cause the silane to be destroyed or consumed by reactions induced by the carrier).

Numerous carriers have been used or tested for such purposes, including porous organic polymers, synthetic silicates, diatomaceous earth, silica, carbon black, and the like. The carriers differ by their particle size, structure and composition, and therefore by their adsorption ability. The finest grades of carriers, i.e., with a particle size of less than 1 micron, may also participate in the composite material properties as fillers or reinforcing components. However, it has been recognized that not all fillers are equivalent, not only in terms of reinforcing and adsorption power, but also in their inertness towards silanes. An attempt to use silica as the carrier produced a product with very restricted shelf life and poor storage stability. It has been demonstrated that some carriers, including silicas, react with silanes; the reaction consists of a hydrolysis due to unavoidable moisture traces on the carrier surface, and subsequent condensation leading to a large proportion of polysiloxane and/or silane bound irreversibly to the carrier surface. The condensation reaction is particularly detrimental to the silane coupling efficiency, because it strongly immobilizes the silane on the carrier surface and prevents its ultimate release, dispersion and usefulness in the filled or reinforced compounds. Silane polymerization on the carrier due to carrier surface reactivity and presence of moisture usually results in poor physical performance of the resulting compound. More important, some or all of the expensive silane is wasted, that is, it cannot disperse during compounding and transfer to other filler particles as intended. The amount of polymerized silane varies with moisture content of the carrier before silane loading, with time and temperature, and especially with the filler surface activity. These parameters are very difficult to control and maintain within narrow specifications. If a carrier could be inert toward premature destruction of the silane, yet be reactive with the silane under compounding or processing conditions, it might serve the dual functions of inert carrier and reactive reinforcing filler. These two goals are in conflict.

To solve these problems, it has been suggested to pre-dry the carrier surface and/or to coat it with a low-cost or non-reactive silane before loading the active silane to avoid any water-induced reaction. However, these processes are not economically feasible and are not favored. Furthermore, it is difficult to eliminate all water from the carrier surface without impairing its adsorption properties. This is usually due to the structure of mineral carrier surfaces, which generally consists of layers of strongly adsorbed water. The physisorbed water on the silica can be eliminated by heating the silica to a temperature of about 105° C. It can be re-absorbed by exposure to moist air. The chemisorbed water is very strongly held through hydrogen bonds and is eliminated at about 200–250° C. This water is close to ionic sites on the carrier surface, and its properties are highly dependent on surface impurities of the carrier surface itself. For instance, it is well known that activating a mineral at temperatures of about 250° C. can make it more reactive towards organic reactions like condensation and radical polymerization. This property has been widely used in catalytic processes. Therefore, dehydrating a mineral at such temperatures often does not reduce its reactivity towards silanes. Constitution water is formed by condensation of pairs of neighboring hydroxyl groups, especially those hydroxyl groups which are very strongly hydrogen-bonded silanols, to liberate water at temperatures between 250 and 800° C. Therefore, to totally eliminate all reactive groups from the carrier surface, it is necessary to calcine the mineral at elevated temperatures. Unfortunately, most carriers will not retain their structure at such temperatures and therefore, this level of drying is not practical.

The availability of carried silane for participation and dispersion in compounding and mixing may be measured by a solvent extraction procedure. A solvent which easily dissolves unreacted silane is used. If the silane can not be extracted, it is also unavailable for compounding and coupling.

For many filled rubber and polymer systems, in which the silane is used to create a covalent bond between the polymer and the filler surface, it is also desirable to use a white silane masterbatch to produce white or lightly colored compounds. White carriers include silicas, silicates, diatomaceous earth, alumina and more generally non-metal oxides. Some of these carriers provide added benefits because they can also behave as fillers in the compound. However, their surface structure is highly polar and tends to contain significant amounts of strongly absorbed water. Furthermore, surface metal ions that generally are present on such carriers can catalyze the silane hydrolysis and condensation reactions. These reactions proceed with varying speeds at room temperature, and are the cause of aging of silica-carried silanes, so that a limited shelf-life has to be imposed onto such masterbatches. Therefore the rubber industry, and more particularly the tire industry, has largely selected carbon black carriers wherever black compounds were produced.

Non-silica carriers, particularly carbon black or porous polymers, are less reactive and contain low levels of weakly absorbed water. However, they are usually more expensive than minerals. Carbon black cannot be used in most colored compounds, though for black rubber applications, like automotive tires, it is possible to use carbon black as a carrier for silanes such as polysulfide silanes.

Now it has been found surprisingly that a specific class of silica fillers are inert during months of shelf storage at e.g.

room temperature towards destructive silane condensation reactions, which prevent the silanes from being desorbed when needed, and that their reactivity in this regard is even lower than carbon black carriers used currently in the rubber industry. These silicas are characterized by a high adsorption ability, a low microporosity, a low differential in the infrared absorbance at 3502 cm$^{-1}$ at 105° C. and at 500° C. as defined herein and in preferred embodiment a surface chemical structure that is modified by the presence of an oxide with acidic character. As an added benefit, these particular silicas may actually have the characteristics of a "reinforcing" filler, rather than a mere inert carrier. Thus the conflicting goals of both "non-reactivity" during shelf storage and eventual reinforcing capability through reactivity in the rubber compounding and curing steps can be met in the same non-carbon-black carrier material.

SUMMARY OF THE INVENTION

One aspect of the present invention is blends of a minimum of one silane and specific silicas as described herein that permit a high level of desorption of the silane and high availability for coupling and reinforcing in a rubber composition. The high availability for coupling and reinforcing is evidenced by the fact that rubber compounded with a blend according to the present invention, which shows high extractibility after up to one year of storage, wherein the blend has been stored at ambient temperature (i.e., 25° C.) for 4, 7.5 or 11 months following its preparation, exhibits a 300% modulus which is within 10% of the 300% modulus exhibited by the same rubber compounded with the blend immediately following its preparation.

The process for making stable masterbatches comprising a blend of silane absorbed on a silica carrier that permits a high level of desorption of the silane, and optional additives, is also taught wherein even after storage for 4 to 12 months after preparation of the blend more than 80% and preferably more than 90% of the silane would not have reacted and thus can be extracted from the carrier by a good solvent for the silane. Final formulated rubber compositions containing the silane are also taught herein.

DETAILED DESCRIPTION OF THE INVENTION

The present invention provides solid silane masterbatches that can be used in plastics or rubber compounds of all colors ranging from light to dark without the drawback of having a limited shelf-life. The blends exhibit the property that a substantial proportion, e.g. at least 80% and preferably greater than 90%, of the silane in the blend can participate as desired in reaction or otherwise exhibit its desired activity when the blend is compounded into other products such as in tire manufacturing.

At ambient conditions, the silane carried on the silica undergoes only very slow conversion, or no conversion at all, to a form which can not subsequently be desorbed from the silica, thus ensuring long shelf-life, and thus avoiding the formation of siloxane oligomers and polymers that are detrimental to rubber properties. Moreover, the present invention provides solid silane masterbatches where the carrier material participates in the reinforcement process of the plastic or rubber material. The solid silane masterbatches, advantageously, are dust-free and free-flowing and appear dry. The masterbatches are an easy way to add liquid or viscous silanes to a carrier material without any special mixers. The solid masterbatches are an efficient and consistent method of delivering of silanes. These masterbatches can be white or very light in color and are useful in any color system.

Master Composition

The silane masterbatch is made up of; (I) a silica carrier; (II) an organofunctional silane; and optionally (III) additives.

(I) Silica

The silica used herein are fine-particle silicas, associated to one-another in the form of aggregates. These aggregates are agglomerated into loose structures that are easily broken down in the compounding process. They are mainly characterized by their structure and their surface properties.

Surprisingly, these silicas do not react so as to polymerize of bind the silane. Thus they release the silane well (i.e., at greater than 80% by weight and preferably greater than 90% by weight), especially as compared to other silicas.

The adsorption behavior of the present silicas is related to both structure (i.e., specific surface type and amount of micro- and macro-capillaries that are able to retain small or large molecules), and surface property (i.e., surface chemistry, surface tension and surface energy that control adsorption energy, and hence under a given condition the amount of adsorbed material per unit area). Adsorption of small molecules like water and gases occur on the whole silica surface, including into small pores where they can penetrate easily.

The preferred silicas useful in this invention are characterized by a relatively low differential between the infrared absorbance (ir) at 3502 cm$^{-1}$ of the silica when taken at 105° C. and when taken at 500° C. Preferably, that differential is less than 1.3 and more preferably less than 1.2. Without intending to be bound by any particular theory of the significance of this property of the silicas useful in this invention, this differential may resemble but is believed to be distinct from mere measurement of the water content of the silica, particularly in that as noted above treatment of silica so as to dehydrate it essentially completely is associated with less satisfactory performance of the silica in the uses made of the present invention. Thus, the aforementioned differential is preferably greater than zero, more typically at least 0.90 or even at least 1.00.

The ir absorbance differential as that term is defined herein is determined as described in Example 9 hereinbelow.

The precipitated silica of the present invention can be prepared with low surface reactivity and BET surface area of at least about 70 to 100 and even up to 300 m$^2$/g and preferably, 160 and 180 m$^2$/g by the process comprising the following steps:

(a) forming an aqueous solution of alkali metal silicate containing part of the total silicate;

(b) heating the mixture to a temperature of about 70° C. to 98° C.;

(c) adding a strong acid until a gel appears;

(d) stopping the addition of the acid and aging the gel;

(e) adding a strong acid;

(f) adding an electrolyte;

(g) simultaneously adding a solution of strong acid and alkali metal silicate;

(h) adjusting the pH to less than 4.5 with a strong acid;

(i) filtering and washing the precipitated silica;

and optionally, (j) redispersing the silica and, in a preferred embodiment, treating the surface with any one or more hydroxides or alkoxides of various metals, preferably of aluminum, filtering and drying.

In the foregoing process steps, the orginal charge of sodium silicate in step (a) contains from 60 to 90 percent by weight of the total silica. The time of strong acid addition and temperature in step (b) are regulated to cause gelatin between 10 and 50 minutes. The aging of the gel in step (d) is for about 5 to 30 minutes. The simultaneous addition and concentrations of the strong acid solution and alkali silicate solution in step (g) is regulated so that the mixture of the two entering the vessel have a pH in the range of 7 to 9.

The electrolyte comprises a salt selected from the group consisting of alkali metal and alkaline earth metal salts, preferably alkali metal sulfate salts. The strong acid is a concentrated acid, and preferably sulfuric acid.

Silica exhibiting the low ir absorbance differential as defined herein can be prepared for carrying silane by controlled beating of silica to temperature conditions (at ambient pressure or preferably under reduced pressure) of about 105° C. to about 250° C. The particular conditions for optimum results will understandably vary with varying silica starting materials but can readily be ascertained for any silica by a simple series of tests to establish the treatment conditions that provide the desired property.

The adsorption of nitrogen is used in the BET method for surface measurement, as a means of measuring the total accessible surface. The BET for the silica of the present invention should be at least 100 m$^2$/g and preferably, 160 to 180 m$^2$/g. The adsorption of larger molecules can only take place on surface that is more readily accessible. This surface, also called external surface, can be measured by the CTAB (cetyl trimethyl ammonium bromide) adsorption. The CTAB of the silica of the present invention should be at least 100 m$^2$/g and preferably, 140 to 160 m$^2$/g. Adsorption of water, particularly in micropores, is determined to the silane masterbatch stability. Therefore, it is preferable to use for the invention silicas with very low microporosity. Such silicas are characterized by a BET surface/CTAB surface ratio of 1.0 to 1.2.

The adsorption of viscous materials and/or large molecules is usually measured in practice by the oil adsorption index, or "DOP absorption".

For silicas of the present invention, an oil adsorption index of at least 100 ml/100 g is necessary, and preferably should be about 150 to 400 ml/100 g.

The silica surface chemistry plays an important role in its activity towards silanes. For the purpose of the invention, low surface reactivity is required. Particularly, silane condensation catalysts, e.g., transition metals, should be present at extremely low levels, i.e., less than 1000 ppm, or preferably, absent.

The surface chemical composition can contain small amounts of a metal oxide other than SiO$_2$. For example, alumina may be used and should be present at 0.02 to 1.0% by weight of the silica, and preferably 0.5 to 0.7% by weight of the silica. For further guidance on controlling surface conditions, see Meguro, K. and E. Sumi, K., "Characterization of the acid-base nature of metal oxides by adsorption of TCNQ", *Acid-Base interactions,* 117–134 (1991), which is incorporated herein by reference.

As a whole, the silica has a very low microporosity, as well as the low absorbance differential at 3502 cm$^{-1}$ as defined herein, a BET surface area of at least 100 m$^2$/g and preferably 160 to 180 m$^2$/g and optionally a surface oxide of aluminum; these combined factors are believed to contribute to the absence of silane condensation in the masterbatch. Suitable silicas for the invention are silicas that provide a combination of all of the above factors.

Exemplary silicas for such purpose are described in European Patent Publication Nos. 0 520 862 (in the name of Rhone-Poulene Chimie). 0 157 703 (in the name of Rhone-Poulene Chimie) and 0 468 140 (in the name of DeGussa AG), which are incorporated herein by reference. One commercially available silica for use herein is ZEOSIL 1165 MP silica from Rhone-Poulene. Others include Hi-Sll 233T-LD from PPG and Ultrasil VN3 SP GR from Degussa.

(II) Silanes

Any organofunctional group-substituted silane with at least one alkoxy group per silicon atom and preferably 2 or 3 alkoxy groups per silicon atom is suitable for use herein. The organofunctional groups are those typically found in organic chemistry and include groups such as mercapto, sulfide, disulfide, polysulfide, vinyl, acetylene, ureido, carboxyl, carbonyl, amino, epoxy, halide and the like.

The organofunctional silanes of the present invention can be defined by the chemical formula:

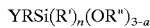

wherein R is a divalent alkylene, arylene or aralkylene group of 1 to 20 carbon atoms, a vinyl group or acetylenyl; R' is a monovalent alkyl, aryl or aralkyl group of 1 to 10 carbon atoms; R" is a monovalent alkyl, aryl or aralkyl group of 1 to 12 carbon atoms, wherein one or more of the carbon atoms can be replaced with a heteroatom, such as oxygen, nitrogen or sulfur; Y is an organofunctional group selected from the group consisting of mercapto; sulfides and polysulfides of the structure R'"—S$_x$— where R'" is a monovalent alkyl, aryl or aralkyl group of 1 to 20 carbon atoms or the radical —RSiR'$_n$(OR")$_{3-a}$, and x is 1 to 9, which resulting molecule must cintain at least one alkoxysilane bond; other bis, tris and higher silanes with sulfur or other heteroatom linkages in the groups between the alkoxy silane groups; vinyl; acetylenyl; carbonyl; amino; alkyl, aralkyl, or aryl substituted amino; ureido; thiocyanate; thiourea;epoxy; hydrogen and the like; and a is an integar and is 0, 1 or 2. In some cases low molecular weight condensates of such silanes may be used.

Examples of such silanes are 3-mercaptopropyltrimethoxysilane, 3-mercaptopropyltriethoxysilane, bis-(3-triethoxysilylpropyl) tetrasulfide (TESPT), vinyltrimethoxysilane, vinyl triethoxysilane, vinyl tris-(2-methoxyethoxy)silane, all commercially available from OSi Specialties, a Witco Company of Danbury, Conn. under the designations, SILQUEST® A-189, A-1891, A-1289, A-171, A-151 and A-172 silanes, respectively. Di-functional silanes or monofunctional silanes, such as mercaptopropylmethyldictthoxysilane, mercaptopropyldimethylethoxysilane and vinyl methyl dimethoxysilane, may also be used.

Preferred organofunctional silanes are those with low condensation rates, particularly sulfur-containing silanes substituted with one, two or three ethoxy or higher molecular weight alkoxy groups on each silicon atom, such as for example 3-mercaptopropyltriethoxysilane, bis-(3-triethoxysilylpropyl)tetrasulfide, bis-(3-methyldiethoxysilylpropyl)-tetrasulfide, bis-(3-triethoxysilylpropyl)disulfide, bis-(3-triethoxysilylpropyl) monosulfide, bis-(2-triethoxysilylethyltolylene)tetrasulfide, bis-2-(3-triethoxysilyl-5-methylphenyl)ethyl trisulfide, bis-(tributoxysilylmethyl) disulfide, bis(3-methyldiethoxysilylpropyl) disulfide, thiocyanatopropyltriethoxysilane, and thioureidopropyl-tris-(isopropoxy)silane.

Epoxy and aminosilanes are also suitable for use herein, although they are inherently less stable. For example gamma-aminopropyl triethoxysilane (SILQUEST® A-1100™ silane from OSi Specialties) may also be used.

(III) Additives

Additives, such as antioxidants, catalysts, peroxides, plasticizers, solvents, accelerators, retarders, vulcanizing agents, processing aids, other silanes which may not be organofunctional such as octyltriethoxysilane or octadocyltrialkoxysilanes, waxes or another filler, like carbon black, may also be present. Any such additive may be present in an amount used to impart the particular function of the additive. Depending on the additive and its function, the amount can be 1% by weight or less, up to 20–50% or higher by weight of the masterbatch.

(IV) Masterbatch

Although it is usually desirable to carry as much silane as possible with fillers that do not participate in reinforcement, in this case it is possible that silane levels as low as 1% of the blend and as high as 80% or higher of the blend can be present. For many applications, the blend can contain 10 to 99 parts by weight of the silica and 1 to 80 parts by weight of the silane component.

Processing

Because silica, even the special type disclosed herein, as normally obtained always contains a significant amount of physisorbed water, it must be dried of physisorbed water before the addition of the silane. The drying operation can be made either in a batch process (e.g., oven, agitated, vacuum, freeze-dried or tumble-dryer) or in a continuous process (e.g., rotating furnace, drying tower, hot air pneumatic conveyor, or fluidized bed). Although a controlled humidity atmosphere (e.g., dry air, or nitrogen) might be used, it is not necessary for the purpose of the invention.

A suitable drying temperature range is 100 to 110° C. Higher temperatures may be used, but do not provide better performance. If a drying technique other than heating is used or if temperature outside 100–110° C. is used, the water content of the silica before silane addition should be the same as that when obtained at equilibrium under 100–110° C., and atmospheric pressure.

The dry silica is placed in a blender (e.g., a low speed powder blender, tumble blender, helical ribbon blender, plough blender, or high speed blender). Silane may be added in all at once or continuously onto silica. A particularly suitable process consists of using silica still warm, immediately after it has been produced and dried as part of the silica production process because the absorption of silane by silica is faster at elevated temperatures of between 80 and 100° C. At lower temperatures the time required for addition is made longer (several hours at room temperature versus a few minutes at 100° C.).

Several minutes are needed to homogenize the moisture, which, preferably, should be free of large agglomerated particles where the particle diameter is greater than 1 mm. At this time any additional additives may also be added as required. The mixture should be allowed to cool down and should be packaged in water-tight containers. Some water may be re-adsorbed from the environment after preparation without detriment, but the use of watertight containers is preferred, in order to minimize this phenomenon.

Applications

The present invention may be used to deliver silanes that are normally by themselves liquid but in accordance with this invention are carried on a dry carrier into a variety of filled polymeric materials. Masterbatches according to the present invention are suitable for use in white, colored and black rubber, plastic, and other reinforced or filled compounds and mechanical parts incorporating same, such as tires, shoe soles, buttons, fan belts, wire and cable insulation, etc.

The term "rubber" as used herein has the meaning normally ascribed to it in this field as a composition containing a major proportion of one or more elastomers and optionally additional functional additives. Suitable elastomers are well-known in this field; examples include styrene-butadiene rubber (SBR), polybutadiene, natural rubber, neoprene, ethylene-propylene rubber (EPR), and the like.

These masterbatches are of special interest in low rolling resistance automotive tire treads. A sample tire tread formulation may include 10% active silane based on silica, BUDENE 1207 cis-polybutadiene, ULTRASIL silica VN-3, SUNDEX 790 plasticizer (Sun Co.) zinc oxide, stearic acid, SUNOLITE 240 antioxidant (distributed by Sovereign Chemical Co.), N-(1,3-dimethyl butyl)-N'-phenyl-ρ-phenylenediamine, sulfur, N-tert-butyl-2-benzothiazolesulfenamide (TBBS), diphenylguanidine (DPG), and N343 carbon black.

In many other applications like shoe soles and colored technical rubber parts, the masterbatches provide an easy way of adding a silane without affecting (e.g. darkening) the color of the final item. As exemplary shoe sole formulation may contain cis-polybutadiene, natural rubber, styrene butadiene rubber, zinc oxide, stearic acid, 2-2 methylene-bis-(4-methyl-6-t-butyl phenol), diethylene glycol, naphthenic oil, sulfur, t-butyl benzyl sulfenamide, TBBS, and 10% silane masterbatch (calculated as percent active silane on silica.)

EXAMPLES

The following examples are descriptive of the present invention and are not intended to be limiting. Comparative examples are included to highlight the benefits provided herein.

Example 1

Into a 20 liter stainless steel reaction vessel equipped with a Lightnin turbine agitator having 6 blades and 4 counter-blades disposed at 90° and a double-jacket heating system were charged at ambient temperature and with agitation 11.7 liters of distilled water and 2 liters of aqueous sodium silicate with a $SiO_2$ to $N_2O$ ratio of 3.25 to 1 and containing 370 grams silica per liter. The temperature of the mixture was raised to 90°±1° C. in about 30 minutes. While maintaining the speed of agitation at 350 rpm and the temperature at 90°±1° C., an aqueous solution of sulfuric acid containing 366 grams sulfuric acid per liter was added at a rate of 12 ml per minute to the mixture by means of a metering pump. The time at which the addition started was called time zero. After 37.5 minutes, the addition of the sulfuric acid was stopped. The mixture was allowed to seed for 15 minutes and then the aqueous solution of the sulfuric acid was again added to the mixture at a flow rate of 12 ml per minute for a period of 37 minutes. In the 75th minute, 1.34 liters of an aqueous solution containing 350 grams of sodium sulfate per liter was added. After 89.5 minutes, the reaction vessel was charged simultaneously over a period of 40 minutes with a solution of 366 grams of sulfuric acid per liter at a flow rate of 5.9 ml per minute and a freshly prepared solution of sodium silicate with a $SiO_2$ to $Na_2O$ ratio of 3.25 to 1 and a silica concentration of 55 grams per liter at a flow rate of 76.1 ml per minute. The pH of the mixture was 7.5±0.2. The sulfuric acid solution was added to the mixture at a flow rate of 5.9 ml per minute until the mixture pH was 3.5, or for approximately 10 minutes. The slurry was then filtered and washed with water to eliminate the sodium sulfate that formed during precipitation. The 907 grams of silica were redispersed into water, 0.129 liter of the sodium sulfate solution was added and the pH of the slurry was adjusted to a value of 6.5 with sodium hydroxide solution. The silica was dried. The characteristics of the silica were

| Characteristic | Value |
| --- | --- |
| BET surface area | 91 m$^2$/g |
| Water loss at 115° C. | 20.7% |
| Surface charge | 0.137 C/m$^2$ |
| SiO$_2$ | 95.0% |
| Na$_2$SO$_4$ | 5.0% |
| pH | 6.5 |

Into a wide-mouthed jar was poured 35 grams of the silica. The open jar and silica were placed in a ventilated oven set at 115° C. for 4 hours. The jar and silica were removed from the oven and weighed. An amount of bis-triethoxysilylpropyl tetrasulfide (TESPT, SILQUEST® A-1289 silane, OSi Specialties a Witco Company) exactly equal to the weight of dry silica was added to the hot silica in one portion. The jar was closed and the contents shaken manually for ½ minutes. The resulting compound was a beige, dry, free-flowing solid, free from agglomerates with diameters greater than 1 mm in diameter, that did not stick to the container walls. The masterbatch was cooled to ambient temperature and tested for extractability. The extractability was determined for the masterbatch after it was stored for 3 and 15 days in a closed jar at ambient temperature. In some other examples, extractibility and compounding performance were determined after four to eleven months of storage.

The extraction test was performed in a 100 ml Soxhlet extraction apparatus. Into the cartridge was placed 30 grams of the masterbatch and 180 grams of dry analytical grade acetone were placed in the flask. The acetone in the extractor was heated to reflux using an oil bath set at 88° C. and the masterbatch was extracted for 2 hours. The cartridge and the extracted material were dried in an explosion-proof oven set at 110° C. to a constant weight. The weight loss was calculated as a percent of extractable silane. Using the above procedure, the extractable silane after 3 and 15 days of storage were 49.6 and 42.8 percent of total composition weight, respectively, or 99.2 and 85.6 percent of the loaded silane.

Example 2

The masterbatch was prepared according to the procedure given in Example 1, except that the 907 grams of redispersed silica were mixed with 25.9 ml of a solution of 350 gram sodium sulfate per liter and the pH of the slurry was adjusted to 9. The characteristics of the silica were:

| Characteristic | Value |
| --- | --- |
| BET surface area | 170 m$^2$/g |
| Water loss at 115° C. | 13.7% |
| Surface charge | 0.230 C/m$^2$ |
| SiO$_2$ | 99.99% |
| Na$_2$SO$_4$ | 0.01% |
| pH | 9.0 |

The extractable silane values from the masterbatch after 3 and 15 days of storage were 48.3 and 41.5, respectively of 96.6 and 83.0 percent of the loaded silane.

Example 3

The masterbatch was prepared according to the procedure given in Example 1, except that the 907 grams of redispersed silica were mixed with 25.9 ml of a solution of 350 grams sodium sulfate per liter and 2.76 grams sodium aluminate and the pH was adjusted to 7. The characteristics of the silica were:

| Characteristic | Value |
| --- | --- |
| BET surface area | 114 m$^2$/g |
| Water loss at 115° C. | 0.8% |
| Surface charge | 0.164 C/m$^2$ |
| SiO$_2$ | 99.89% |
| Al | 0.1% |
| Na$_2$SO$_4$ | 0.01% |
| pH | 7.0 |

The extractable silane from the masterbatch after 3 and 15 days of storage were 47.1 and 46.4 percent, respectively or 94.2 and 92.8 percent of the loaded silane.

Example 4

The masterbatch was prepared according to the procedure given in Example 3 except that the pH of the redispersed silica was adjusted to 9. The characteristics of the silica were:

| Characteristic | Value |
| --- | --- |
| BET surface area | 72 m$^2$/g |
| Water loss at 115° C. | 1.5% |
| Surface charge | 0.115 C/m$^2$ |
| SiO$_2$ | 99.69% |
| Al | 0.099% |
| Na$_2$SO$_4$ | 0.01% |
| pH | 9.0 |

The extractable silane from the masterbatch after 3 and 15 days of storage was 49.3 and 48.2 percent, respectively, or 98.6 and 96.4 percent of the loaded silane.

Example 5

The masterbatch was prepared according to the procedure given in Example 1, except that the 907 grams of the redispersed silica were mixed with 0.129 liters of a solution of 350 grams of sodium sulfate per liter and 2.76 grams of sodium aluminate and the pH was adjusted to 9. The characteristics of the silica were:

| Characteristic | Value |
| --- | --- |
| BET surface area | 94 m$^2$/g |
| Water loss at 115° C. | 1.4% |
| Surface charge | 0.141 C/m$^2$ |
| SiO$_2$ | 94.7% |
| Al | 0.094 |
| Na$_2$SO$_4$ | 5.0% |
| pH | 9.0 |

The extractable silane from the masterbatch after 3 and 15 days of storage was 49.2 and 49.2 percent, or 98.4 and 98.4 percent of the loaded silane.

Example 6

The masterbatch was prepared according to the procedure given in Example 5 except that 13.8 grams of sodium aluminate was mixed with the redispersed silica. The characteristics of the silica were:

| Characteristic | Value |
| --- | --- |
| BET surface area | 105 m$^2$/g |
| Water loss at 115° C. | 1.4% |
| Surface charge | 0.153 C/m$^2$ |
| SiO$_2$ | 93.5% |
| Al | 0.47% |
| Na$_2$SO$_4$ | 4.9% |
| pH | 9.0 |

The extractable silane from the masterbatch after 3 and 15 days of storage was 48.5 and 48.3 percent, respectively, or 97.0 and 96.6 percent of the loaded silane.

Comparative Example 7

The masterbatch was prepared according to the procedure given in Example 2, except that the pH of the redispersed silica was adjusted to 7. The characteristics of the silica were:

| Characteristic | Value |
| --- | --- |
| BET surface area | 104 m$^2$/g |
| Water loss at 115° C. | 17.4% |
| Surface charge | 0.153 C/m$^2$ |
| SiO$_2$ | 99.99% |
| Na$_2$SO$_4$ | 0.01% |
| pH | 7.0 |

The extractable silanes from the masterbatch after 3 and 15 days of storage were 39.5 and 33.8 percent, respectively or 79.0 and 67.6 percent of the loaded silane.

Comparative Example 8

The masterbatch was prepared according to the procedure given in Example 2, except that the pH of the redispersed silica was adjusted to 4.5. The characteristics of the silica were:

| Characteristic | Value |
| --- | --- |
| BET surface area | 110 m$^2$/g |
| Water loss at 115° C. | 30.1% |
| Surface charge | 0.159 C/m$^2$ |
| SiO$_2$ | 99.99% |
| Na$_2$SO$_4$ | 0.01% |
| pH | 4.5 |

The extractable silanes from the masterbatch after 3 and 15 days of storage were 26.6 and 25.5 percent, respectively, or 53.2 and 51.0 percent of the loaded silane.

Example 9

Commercially available silicas were prepared as a self-supported pellet. The silica was ground in air with agate mortar and pestle for two minutes. Sixteen milligrams of the ground silica was placed in a standard IR pellet making die assembly (PMA) consisting of a cylinder, base, metal die pellet and a longer rod (plunger) which rests above the metal die pellet inside the cylinder of the die assembly. The silica, sandwiched between the metal die pellet and the rod (plunger), was present using a Carver, Inc. Model C press at 2800 pounds applied to the 0.520" diameter rod (plunger) in the die assembly.

The 0.5" diameter self-supported silica sample pellet was removed from the PMA and transferred to a magnetic stainless steel holder consisting of two 0.906" diameter metal washers held together by a single 2–56×$^3$/$_{16}$" stainless steel Unified National Course Thread screw with its center located 0.352" from the center of the washer assembly. Both washers when assembled have a 0.375" diameter opening. One washer was machined to a depth of 0.045" and to a diameter of 0.520" to provide a recessed area for the sample pellet. The other washed was placed over the washer holding the silica pellet and the screw tightened.

The silica pellet in its holder was placed into the activation chamber of a pyrex IR cell. The use of an IR cell and the self-supported pellet technique was first described by C. L. Angell. The IR cell consists of a pyrex tube 7.5" long sealed and flattened at the bottom (activation chamber), an 8" long pyrex "arm" or flat tube of rectangular cross-section having dimensions 10 mm OD×28 mm OD which is sealed at a right angle to the upper (open) portion of the activation tube with the tube having flat sides parallel to the plane containing the axis of the pyrex tube (vertical plane) used to activate the silica pellet. The other end of the flat arm is sealed and has two 0.5" bore holes, one one each side which are covered by two calcium fluoride windows sealed to the flat glass surfaces using Pliobond cement. The open end of the IR cell consists of a 29/42 female taper joint. After the silica pellet is placed into the activation chamber (bottom of the tube), the connection is made at the taper joint by sealing with Apiezon "N" grease to its mating male joint which is part of an assembly containing a V-4 stopcock and 18/9 male ball joint.

The silica pellet in its holder resting at the bottom of the activation chamber of the IR cell was activated initially by dynamic (continuous pumping at 23° C. for 15 minutes using a vacuum manifold with diffusion pump and evacuated to a pressure of 10$^{-3}$ Torr. The sample pellet was then moved to the flat sidearm between the calcium fluoride windows using a magnet outside the cell. Two FTTR spectra spectra for the silica were obtained after inserting the sidearm of the IR cell into the IR beam in the sample chamber of a BIO-RAD FTS-65 FTIR spectrometer, and after heating the same pellet to 105° C. and 500° C. The first FTIR spectrum was taken after heating the silica pellet for 1 hour at 10$^{-3}$ Torr and 105° C. The second FTIR spectrum was taken after further heating the sample for 1 hour at 200° C., for 1 hour at 300° C., for 1 hour at 400° C. and finally for 1 hour at 500° C. at 10$^{-3}$ Torr. There were no air exposures between treatments. Sample pellets were then weighed immediately upon exposure to ambient air.

The FTIR spectra were recorded and the absorbance data computed in the following manner.

The FTIR spectrum in absorbance was recorded for the silica after 105° C. and again after 500° C. referenced against the spectrum for the empty IR cell with calcium fluoride windows and empty pellet holder.

The absorbance spectrum for the silica after heating at 500° C. was subtracted from the absorbance spectrum for the silica after heating at 105° C. A "subtraction spectrum" was generated using the BIO-RAD software at the spectrometer.

The absorbance differential for the silica was measured as the difference between the peak absorbance at 3502 cm$^{-1}$ and the zero absorbance baseline in the "subtraction spectrum". The normalized absorbance differential ($A_d$) data for all silica samples were corrected (normalized to a 14.5 milligram pellet weight) using the equation:

$$A_d = A_o^{\,\circ} (14.5 \text{ milligrams/weight of sample in milligrams})$$

$A_d^{\,\circ}$ is the absorbance differential that was measured using the FTIR technique.

The following Table 1 sets forth the absorbance parameter for ZEOSIL 1165 MP silica and for several other silicas. The Table also sets forth the degree to which the silane, bis-(3-triethoxysilylpropyl)tetrasulfide could be extracted from a silane masterbatch thereof with each indicated silica. These data show that a low IR absorbance differential correlates with high extractability.

TABLE I

| Silica | Absorbance Differential | % Extractability after 15 days |
|---|---|---|
| Zeosil 1165 MP (Rhone-Poulenc) | 1.12 | 99 |
| Hi-Sil 233T-LD (PPG) | 1.21 | 100 |
| Ultrasil VN3 SP GR (Degussa) | 1.22 | 96 |
| Silica prepared in Example 4 | 1.08 | 99 (after 3 days) |
| Hi-Sil 233 (PPG) | 1.43 | 36 |
| Hi-Sil 233 (repeat) | 1.50 | 36 |
| Durosil (Degussa) | 1.40 | 30 |
| Comparative Example 8 | 1.3* | 51 |

*The final activation at 500° C. for this sample was done for 3 hours.

EXAMPLE 10

35 g of silica (ZEOSIL 1165 MP silica from Rhone-Poulenc of Lyon, France) with the following properties:

| Characteristic | Value |
|---|---|
| BET surface area | 180 $m^2/g$ |
| CTAB surface: | 160 $m^2/g$ |
| BET/CTAB: | 1.125 |
| DOP adsorption: | 270 ml/100 g |
| Water loss at 105° C. | 6% |
| Loss on ignition at 1000° C.: | 10.5% |
| $SiO_2$: | 98.5% |
| $Al_2O_3$ | 0.4% |
| pH: | 6.5 | were poured in a 1 liter wide-mouthed jar. The open jar was placed in a ventilated oven at 105° C. and left for drying for 4 hours. To the hot silica, 65 g of bis-triethoxysilylpropyl tetrasulfide (TESPT, SILQUEST® A-1289 silane, OSi Specialties) were added in one portion and the jar was closed and shaken manually for ½ minute. The resulting compound was a beige, dry, free-flowing solid, free from agglomerates, that did not stick to the container walls. The masterbatch was left to cool down and tested for extractability.

The extraction test was performed in a 100 ml Soxhlet extraction apparatus. 30 g of the masterbatch were placed in the cartridge, and 180 g of dry analytical grade acetone were placed in the flask.

The extraction was performed in 2 hours from reflux start. The flask was heated with an oil bath to 88° C. The cartridge was ultimately dried in an explosion-proof oven at 110° C. to constant weight.

The weight-loss is calculated as a percent of extractable silane. Using the above procedure, the extractable silane content was 64.7% of total composition weight, or 99.5% of loaded silane. The same sample was tested after storage in closed containers at ambient temperature for 3 and 15 days and the extraction test was repeated. The extracted silane as respectively 64.1% and 64.2% of total composition weight or 98.6% and 98.7% of loaded silane. Thus, there was no significant change in extractable silane under these conditions.

Example 11

35 g of the silica used in Example 10 were processed as in Example 10, except that the drying stage was performed at an oven temperature of 150° C. The extracted silane after 3 and 15 days was 63.7 and 62.4 percent, respectively, of total composition weight, or 98.0 and 96.0 percent of loaded silane.

Example 12

35 g of the silica used in Example 10 were processed as in Example 10, except that the drying stage was performed at an oven temperature of 200° C. The extracted silane after 3 and 15 days was 63.6 and 62.0 percent, respectively, of the total composition weight, or 97.9 and 95.4 percent of the loaded silane.

Comparative Example 13

50 g of the silica used in Example 10 was processed as in Example 10, except that it was used as received, without drying, with 50 g of TESPT added to the neat silica. The extracted silane after 7 and 30 days was 43.0 and 41.0 percent, respectively, of the total composition weight, or 66.2 and 63.1 percent of the loaded silane. The results above indicate that there was a significant loss in extractible silane due to reaction with the silica and the physisorbed water.

Comparative Example 14

50 g of Silica 2 (SIPERNAT 22 silica from Degussa AG of Frankfurt, Germany) with the following properties:

| Characteristic | Value |
|---|---|
| BET surface area | 180 $m^2/g$ |
| CTAB surface | 160 $m^2/g$ |
| BET/CTAB | 1.125 |
| DOP adsorption: | 300 ml/100 g |
| Water loss at 105° C. | 6% |
| LOI at 1000° C. | 11% |
| $SiO_2$ | 98% |
| $Al_2O_3$ | 0.0% |
| pH | 6.0 | were dried at 105° C. as in Example 10, and 50 g of TESPT were added. The masterbatch was extracted 3 and 15 days after blending and the results showed 45.6 and 41.6 percent, respectively, of the total composition weight, or 91.2 and 83.2 percent of the loaded silane.

Comparative Example 15

30 g of Silica (TIXOSIL 38A, Rhône-Poulenc), which has a high BET, low alumina content and high pH with the following specific properties:

| Characteristic | Value |
|---|---|
| BET surface area | 225 $m^2/g$ |
| Water loss at 105° C. | 7% |
| LOI at 1000° C. | 11.5% |
| $SiO_2$ | 96.8% |
| $Al_2O_3$ | 0.05% |
| pH | 7.1 | were dried in an oven at 105° C. as in Example 10, and mixed with 70 g of TESPT silane. The extracted silane after 7 and 15 days was 42.8 and 39.7 percent, respectively, of the total composition weight, or 61.1 and 56.7 percent of the loaded silane.

Comparative Examples 16 and 17

The same test as in Example 15 was repeated using TIXOSIL 38A silica with drying temperatures of 150° C. (Example 16) and 200° C. (Example 17). In no case was it possible to obtain a stable masterbatch, as defined by the masterbatch being free-flowing and apparently dry.

Examples 18–24

The test as in Example 10 was repeated with different amounts and varieties of silane being used. Examples 18 and 24 include the use of a commercially available carbon black blended with the silica. The results are set forth below with the silanes being designated by their tradenames as commercially available from OSi Specialties. All masterbatches showed excellent extraction release performance, except Example 22 demonstrates that an aminosilane presented some difficulties, but the performance was better than expected given the amine's basicity, self-catalyzing potential and hydrophilic nature. The extraction of Example 22 was performed with diethyl ether to avoid any reaction between the aminosilane and acetone.

Comparative Example 25

Twenty-five grams of high surface carbon black, (PRINTEX Xe2 commercially available from Degussa AG, Frankfurt, Germany) used neat without drying, was mixed with 75 g of TESPT. The resulting silane masterbatch did not yield good results as indicated below in Table II.

Comparative Example 26

Example 10 was repeated with another high surface area silica, HI-SIL ABS, available from PPG Industries, Inc. of Pittsburgh, Pa. that does not contain alumina and has a solution of pH of 7.0. The results below in Table II indicate that this silica is not a good carrier for silanes.

TABLE II

| Example | Silica (%) | Carbon Black (%) | Silane (%) | % Extracted After 3 Days | % of Loaded Silane | % Extracted After 15 Days | % of Loaded Silane |
|---|---|---|---|---|---|---|---|
| 18 | 1165 MP (40) | N330 (10) | A-1289 (50) | 48.3 | 97.0 | 48.9 | 98. |
| 19 | 1165 MP (50) | | RC-2 (50) | 46.2 | 92 | 44.7 | 89 |
| 20 | 1165 MP (50) | | A-189 (50) | 49.6 | 99 | 47.8 | 96 |
| 21 | 1165 MP (50) | | A-1891 (50) | 49.9 | 100 | 48.8 | 98 |
| 22 | 1165 MP (50) | | A-1100 (50) | 36.1 | 72 | | |
| 23 | 1165 MP (50) | | A-187 (50) | 49.3 | 99 | 48.5 | 97 |
| 24 | 1165 MP (50) | Statex N330(3) | A-1289 (50) | 47.1 | 94 | 98.0 | 96 |
| 25 | Printex Xe2 (25) | | A-1289 (75) | 20.1 | 26.8 | | |
| 26 | HiSil ABS (50) | | A-1289 (50) | 24.7 | 49 | 23.8 | 48 |

Comparative Example 27

A silane masterbatch was prepared as in Example 10, except for the use of calcium silicate with a solution pH of 9. Even the freshly prepared masterbatch showed a very poor extraction release performance. The extractable silane of the freshly prepared masterbatch was 20 percent of the total composition weight or 29 percent of the loaded silane.

Example 28

The silane masterbatch of Example 10 was used in the following rubber formulation:

| Ingredient | phr |
|---|---|
| SBR 1502 (styrene-butadiene rubber) | 100 |
| Silica, ULTRASIL VN3, Degussa | 50 |
| PERMANAX OD antioxidant (Flexsys) | 2 |
| PEG 4000 Polyethylene glycol | 3 |
| ZnO | 3 |
| Stearic acid | 3 |
| Silane (active) | 5 |
| Sulfur | 2.25 |
| MBTS (2-2'dibenzothiazole disulfide) | 0.75 |
| DOTG (di-o-tolylguanidine) | 1.5 |

The compound was made in an internal mixer. The sulfur and coupling agent masterbatch were added in a second stage on a roll-mill.

The rheological properties were measured at 150° C. according to the French standard NFT 43015:

| Rheological Property | Value |
|---|---|
| Minimum Torque: | 15.80 in. lb |
| 60 min torque (no maximum): | 124.90 in. lb |
| Scorch | |
| $t_s2$: | 3.65 min |
| $t_{50}$: | 7.58 min |
| $t_{90}$: | 20.25 min |
| $t_{98}$: | 40.08 min |

The mechanical properties were measured according to NFT 46002:

| Mechanical Property | Value |
|---|---|
| Shore A Hardness: | 78 |
| 100% Modulus: | 3.8 MPa |
| 300% Modulus: | 13.8 MPa |
| Tensile Strength: | 19.6 MPa |
| Elongation: | 399% |
| Trouser Tear Strength: | 6.5 dN/cm |
| Relative Abrasion Loss (NFT 46012): | 158 |

Comparative Example 29

Example 28 was repeated, replacing the silica in the masterbatch by N330 carbon black. The silane masterbatch was prepared as in Example 10.

| | Value |
|---|---|
| Rheological Property | |
| Minimum Torque: | 15.41 in. lb |
| 60 min Torque: | 122.70 in. lb |
| Scorch | |
| $t_s2$: | 3.70 min |
| $t_{50}$: | 7.61 min |
| $t_{90}$: | 20.64 min |
| $t_{98}$: | 43.31 min |

-continued

| Mechanical Property | Value |
|---|---|
| Shore A Hardness: | 77 |
| 100% Modulus: | 3.9 MPa |
| 300% Modulus: | 14.6 MPa |
| Tensile Strength: | 19.1 MPa |
| Elongation: | 376% |
| Trouser Tear Strength: | 5.8 dN/cm |
| Relative Abrasion Loss (NFT 46012): | 155 |

Surprisingly, the properties are substantially the same as in Example 28 with the silica masterbatch, thus indicating the use of silica according to the present invention is better in achieving the same quality as the prior art, but less expensively and with no color.

Comparative Example 30

Example 28 was repeated, using the masterbatch of Example 13 (the silica was not dried at 105° C. before adding the silane).

| Rheological Property | Value |
|---|---|
| Minimum Torque: | 18.40 in. lb |
| Maximum Torque: | 122.70 in. lb |
| Scorch | |
| $t_s2$: | 3.44 min |
| $t_{50}$: | 6.92 min |
| $t_{90}$: | 17.24 min |
| $t_{98}$: | 36.32 min |

| Mechanical Property | Value |
|---|---|
| Shore A Hardness: | 76 |
| 100% Modulus: | 3.5 MPa |
| 300% Modulus: | 11.8 MPa |
| Tensile Strength: | 17.9 MPa |
| Elongation: | 414% |
| Trouser Tear Strength: | 7.3 dN/cm |
| Relative Abrasion Loss (NFT 46012): | 172 |

Although there is a slight improvement in elongation and tear strength, it is outweighed by the reduction in scorch time, modulus and abrasion resistance. This reduction in 300% modulus is a particularly clear indication that silane as not available for coupling and reinforcement. This confirms that the amount of extractable silane is related to a rubber properties, and demonstrates the improvement in final rubber properties brought by the treatment under the invention.

Examples 31–34

Examples 31 through 34 show that reduced extractibility of silane correlates with reduced coupling and reinforcement performance of the blend in a rubber compound.

Example 31

Samples were prepared of 50 wt. % bis-(3-triethoxysilylpropyl) tetrasulfide (TESPT) (SILQUEST A-1289, OSi Specialties) on precipitated silica ZEOSIL 1165 MP from Rhone Poulenc as described in Example 10. This silica has an IR absorbance differential of 1.12 (Table I). The silane masterbatch was aged for 4 months under ambient conditions in a sealed container. Extraction tests were performed on the silica masterbatches in order to evaluate the amount of free extractable silane not bound to the silica surface. Extraction was made in a 500 ml Soxhlet apparatus, using 50 g of masterbatch and 180 ml of acetone, and boiling at reflux for 120 minutes. The silane masterbatch extractibility was 48 percent, or 96 percent of the loaded silane, after 4 months of storage.

The silane masterbatch was compounded into a typical rubber tire tread formulation, and was treated for the rheological properties before curing and for the mechanical properties of the resulting rubber.

The rubber formulations contained the following:

| Ingredient | phr |
|---|---|
| SBR 1502 | 100. |
| VN3 Silica (DeGussa) | 50. |
| Diisopropyl paraphenylene diamine | 1.5 |
| Dihexyl paraphenylene diamine | 1.5 |
| ZnO | 4. |
| Stearic Acid | 1.5 |
| Silane masterbatch | 8. |
| Sulfur | 1.75 |
| Cyclohexylbenzothiazolesulfonamide | 2.5 |

Rheology curves were recorded on a Monsanto Reolink rheometer. Samples were tested according to French Standard NF 43015 for the rheological properties, and according to NF 46002 using 5x H2 specimens for the mechanical properties. The specimens were cut from 2 mm plaques cured for 25 minutes at 160° C. Abrasion was measured according to NF 46012 on three specimens which were cut from 6 mm plaques curved for 35 minutes at 160° C. The rheological and mechanical properties are given below in Table III.

Comparative Example 32

The silane masterbatch was prepared as described in Example 31, except that the silica was not dried prior to treatment with the silane and the masterbatch was aged for 2 weeks under ambient conditions. The silane masterbatch extractability was 41 percent or 82 percent of the loaded silane. The rheological and mechanical properties are given below in Table III. The masterbatch produced a significantly lower viscosity compound with a slower cure and a significantly lower 300% modulus and higher percent elongation when compared to Example 31 or 34. These results indicate that less silane was available for coupling and reinforcement, consistent with the fact that less silane was accessible by extraction (only 82% of the total). Even this silica with a desirably low IR absorbance differential (Table I) gave poor performance when it was not dried before treatment with the silane.

Example 33

The silane masterbatch was prepared as described in Example 31. The masterbatch was aged 7 days at 50° C. and then 7 days under ambient conditions. The silane masterbatch extractability was 45 percent or 90 percent of the loaded silane. The rheological and mechanical properties are given below in Table III. There may be a slight reduction in 300% modulus, close to experimental error, compared to Example 31.

Example 34

The silane masterbatch was prepared as described in Example 31. The masterbatch was aged for 7 days under ambient conditions. The silane masterbatch extractability was 50 percent or 100 percent of the loaded silane. The rheological and mechanical properties are given below in Table III.

and all of the silane mixed with approximately 35–40 grams of this portion of silica in an EVA bag or silane masterbatch in an EVA bag were added and ram down mixed for 30 seconds. The remaining silica and the oil in an EVA bag were next added and ram down mixed for 30 seconds. The Banbury mixer throat was thrice dusted down and the mixture ram down mixed for 15 seconds each time. The Banbury mixer's mixing speed was increased to 160 or 240 rpm, as required to raise the temperature of the rubber masterbatch to between 160–165° C. in approximately 1 minute. The masterbatch was dumped (removed from the Banbury mixer), a sheet was formed on a roll mill st at about 50 to 60° C., and then allowed to cool to ambient temperature.

The rubber masterbatch was added to the Banbury mixer with the mixer at 120 rpm and cooling water turn on full and ram down mixed for 30 seconds. The remainder of the ingredients were added and ram down mixed for 30 seconds. The Banbury mixer throat was dusted down, the mixer speed increased to 160 or 240 rpm so that the contents reached a temperature between 160 and 165° C. in approximately 2 minutes. The rubber masterbatch was mixed for 8 minutes and the speed of the Banbury mixer was adjusted to maintain the temperature between 160 and 165° C. The masterbatch was dumped (removed from the Banbury mixer), a sheet was formed on a roll mill set at about 50 to 60° C., and then allowed to cool to ambient temperature.

The rubber masterbatch and curatives were mixed on 6 in.×13 in. (15 cm×33 cm) two roll mill that was heated to between 50 and 60° C. The sulfur and accelerators were added to the rubber masterbatch and thoroughly mixed on the roll mix and allowed to form a sheet. The sheet was cooled to ambient conditions for 24 hours before it was cured. The rheological properties were measured on a Monsanto R-100 Oscillating Disk Rheometer and a Monsanto M1400 Mooney Viscometer.

TABLE III

Rheological Properties

| Example | Min. Torque (in. lb.) | Max. Torque (in. lb.) | $t_s2$ | t50 | t90 | t98 |
|---|---|---|---|---|---|---|
| 31 | 19.2 | 108.85 | 5.47 | 10.55 | 19.73 | 40.7 |
| 32 | 19.61 | 100.68 | 5.61 | 10.69 | 18.04 | 31.62 |
| 33 | 19.3 | 107.83 | 5.65 | 10.82 | 21.01 | 42.82 |
| 34 | 19.24 | 109.16 | 5.62 | 10.6 | 20.8 | 42.16 |

Mechanical Properties

| Example | Shore A | 100% Mod. (MPa) | 300% Mod. (MPa) | Tensile (MPa) | Elong. (%) | Trouser tear | Abrasion loss (%) |
|---|---|---|---|---|---|---|---|
| 31 | 76 | 3.2 | 12.8 | 18.5 | 393 | 11.9 | 135 |
| 32 | 73 | 2.3 | 8.7 | 19.7 | 521 | 10.5 | 140 |
| 33 | 76 | 3.1 | 12. | 18.9 | 415 | 10.7 | 140 |
| 34 | 76 | 3.3 | 13.6 | 17.8 | 363 | 9.6 | 135 |

Example 35

Silane masterbatches were prepared as described in Example 31 and allowed to shelf-age in closed bottles at ambient laboratory conditions for approximately 2.5, 7.5 and 11 months. This particular silica was used in Example 31 and showed an IR absorbance differential of 1.17. The masterbatches showed 90% extractability after 2 months of aging and after 4 months of aging and after 6 months of aging, and showed 86.8% extractability after 12 months of aging. A freshly prepared masterbatch was one control. The liquid bis-(3-triethoxysilylpropyl) tetrasulfide (Silquest® A-1289 for OSi Specialties, A Witco Company) was used as an additional control. The silane masterbatches and liquid silane were compounded into the model low rolling resistance tire tread formulation set forth as following:

| Ingredient | phr |
|---|---|
| Rubber Masterbatch | |
| Solution SBR (Solflex 1216, Goodyear) | 75 |
| BR (Budene 1207, Goodyear) | 25 |
| Silica, precipitated (Zeosil 1165MP, Rhone-Poulene) | 80 or 73 |
| Silane (Silquest ® A-1289) or masterbatch | 7 or 14 |
| Aromatic Oil (Sundex 8125, Sun) | 32.5 |
| Zinc Oxide (Kadox 720C, Zinc Corp.) | 2.5 |
| Stearic Acid (Industrene R, Witco) | 1 |
| 6PPD Antiozonant (Santoflex 6PPD, Flexsys) | 2 |
| Microcrystalline Paraffin Wax (M-4067, Schumann) | 1.5 |
| N-330 Carbon Black (Engineered Carbons) | 3.0 |
| Rubber Curative | |
| Rubbermakers Sulfur (#104, Sunbelt) | 2.8 |
| CBS Accelerator (Santocure, Flexsys) | 3.4 |
| DPG Accelerator (Perkacit DPG-C, Flexsys) | 4. |

Rubber masterbatch was mixed in a Model "B" "Banbury" (Farrell Corp., Ansonia, Conn.) mixer with a 103 cu. in. (1690 cc) chamber volume. 1191 grams rubber masterbatch gives approx. 60% fill factor. The mixing of the rubber masterbatch was done in two steps. The Banbury mixer was turned on with the mixer at 120 rpm and the cooling water on full. The rubber polymers were added to the Banbury mixer and ram down mixed for 30 seconds. Half the silica

| | Liquid | Age of silane masterbatch | | |
|---|---|---|---|---|
| Property | A-1289 | Unaged | 7.5 mo. | 11 mo. |
| Rheological Properties | | | | |
| $M_T$, dN-m | 10.1 | 9.6 | 9.9 | 9.7 |

-continued

| Property | Liquid A-1289 | Age of silane masterbatch | | |
|---|---|---|---|---|
| | | Unaged | 7.5 mo. | 11 mo. |
| M$_H$, dN-m | 32.7 | 31.6 | 31.9 | 31.9 |
| t90, minutes | 18.3 | 18.3 | 18.1 | 18.2 |
| t$_s$1 | 4.4 | 4.7 | 4.6 | 4.5 |
| Minimum Mooney Viscosity (at 100° C.) | 84. | 83. | 84. | 84. |
| Minimum Mooney Viscosity (at 135° C.) | 43.9 | 42.5 | 43.1 | 43.7 |
| Mooney Scorch at 135° C. (MS1 + t$_5$, min) | 6.9 | 7.4 | 7.4 | 7.4 |
| Mooney Cure at 135° C. (MS1 + t$_{35}$, min.) | 9.5 | 10.0 | 9.9 | 9.9 |
| Mechanical Properties | | | | |
| Tensile, MPa | 19.7 | 19.8 | 18.5 | 19.3 |
| Elongation, % | 457 | 462 | 444 | 461 |
| 100% modulus MPa | 1.82 | 1.78 | 1.79 | 1.75 |
| 200% modulus MPa | 4.75 | 4.56 | 4.56 | 4.37 |
| 300% modulus MPa | 10.16 | 9.73 | 9.66 | 9.31 |
| Hardness, Shore A | 58 | 59 | 58 | 58 |
| Tan delta at 0.15% strain | | | | |
| 0° C. and 1 Hz | 0.1598 | 0.1636 | 0.1640 | 0.1699 |
| 0° C. and 10 Hz | 0.2241 | 0.2183 | 0.2239 | 0.2258 |
| 60° C. and 1 Hz | 0.0959 | 0.0930 | 0.0981 | 0.1002 |
| 60° C. and 10 Hz | 0.1078 | 0.1114 | 0.1154 | 0.1150 |

The silane masterbatches that were aged 7.5 and 11 months gave rheological and mechanical properties very close to liquid (bis-(3-triethoxysilylpropyl) tetrasulfide and unaged silane masterbatch to all the properties tested. Other tests performed earlier (after 2.5 and 5 months of aging) also showed the same results with +/−10%. The differences in the mechanical property values and in the tan δ values were within the +/−10% considered in the rubber industry as normal experimental variation. The processing properties, such as Mooney viscosity, were virtually identical. There was no significant deterioration of silane masterbatch activity after aging for 11 months of room temperature storage. Extraction remained high (87%) after 12 months.

What is claimed is:

1. A rubber composition which comprises (a) an elastomer and (b) a blend comprising at least one silane and silica, which blend is characterized in that the silica is not reacted to bind or polymerize the silane, over 80% by weight of the silane in the blend can be extracted from said silica prior to the addition of the blend to the elastomer and wherein the differential between the infrared absorbance at 3502 cm$^{-1}$ of the silica when taken at 105° C. and when taken at 500° C. is less than 1.3.

2. A rubber according to claim 1 wherein said silane has the chemical formula:

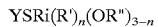

YSRi(R')$_n$(OR")$_{3-n}$ wherein R is a divalent alkylene, arylene or aralkylene group of 1 to 20 carbon atoms, a vinyl group of acetylenyl; R' is a monovalent alkyl, aryl or aralkyl group of 1 to 10 carbon atoms; R" is a monovalent alkyl, aryl or aralkyl group of 1 to 12 carbon atoms, wherein one or more of the carbon atoms can be replaced with oxygen, nitrogen or sulfur; Y is an organofunctional group selected from the group consisting of mercapto:sulfide and polysulfide of the structure R'"—S$_n$— where R'" is a monovalent alkyl, aryl or aralkyl group of 1 to 20 carbon atoms or the radical, —RSiR'$_n$(OR")$_{3-n}$, and x is 1 to 9; other bis, tris, and higher silanes with sulfur or other heteroatom linkages in the groups between the alkoxy silane groups; vinyl; acetylenyl; carbonyl; amino; alkyl, aralkyl or aryl substituted amino; ureido; thiocyanate; thiourea; epoxy; and hydrogen; and a is an integer and is 0, 1 or 2.

3. A rubber according to claim 1 wherein said silane is selected from the group consisting of sulfur-containing silanes with one, two or three alkoxy groups attached to each silicon atom.

4. A rubber according to claim 1 comprising 10 to 99 parts by weight of said silica and 1 to 80 parts by weight of said silane.

5. A rubber according to claim 1 wherein said silane is selected from the group consisting of 3-mercaptopropyltrimethoxysilane, 3-mercaptopropyltriethoxysilane, bis-(3-triethoxysilylpropyl) tetrasulfide, vinyltrimethoxysilane, vinyltriethoxysilane, vinyl tris-2-(methoxyethoxy)silane, mercaptopropylmethyldiethoxysilane, mercaptopropyldimethylethoxysilane, vinyl methyldimethoxysilane, bis-(3-triethoxysilylpropyl) disulfide, bis-(3-methyldiethoxysilylpropyl) tetrasulfide, bis-(3-triethoxysilylpropyl) monosulfide, bis-(2-trietoxysilylethyltolylene) tetrasulfide, bis-2-(3-triethoxysilyl-5-methylphenyl)ethyl trisulfide, bis-tributoxysilylmethyl disulfide, bis-(3-methyldiethoxysilylpropyl) disulfide, thiocyanatopropyltriethoxysilane, and thioreidopropyltrimethoxysilane.

6. A rubber according to claim 1 wherein said silica exhibits a differential between its infrared absorbance at 3502 cm$^{-1}$ at 105° C. and at 500° C. of less than 1.3.

7. A rubber blend according to claim 6 wherein said differential is greater than 0.9.

8. A rubber blend according to claim 6 wherein said silane has the chemical formula:

YRSi(R')$_n$(OR")$_n$(OR")$_{3-n}$ wherein R is a divalent alkylene, arylene or aralkylene group of 1 to 20 carbon atoms, a vinyl group or acetylenyl; R' is a monovalent alkyl, aryl or aralkyl group of 1 to 10 carbon atoms; R" is a monovalent alkyl, aryl or aralkyl group of 1 to 12 carbon atoms, wherein one or more of the carbon atoms can be replaced with oxygen, nitrogen or sulfur; Y is an organofunctional group selected from the group consisting of mercapto; sulfide and polysulfide of the structure R'"—S$_x$— where R'" is a monovalent alkyl, aryl or aralkyl group of 1 to 20 carbon atoms or the radical, —RSiR'$_n$(OR")$_{3-n}$, and x is 1 to 9; other bis, tris and higher silanes with sulfur or other heteroatom linkages in the groups between the alkoxy silane groups; vinyl; acetylenyl; carbonyl; amino; alkyl, aralkyl or aryl substituted amino; ureido; thiocyanate; thiourea; epoxy; and hydrogen; and a is an integer and is 0, 1 or 2.

9. A rubber according to claim 6 wherein said silane is selected from the group consisting of sulfur-containing silanes with one, two or three alkoxy groups attached to each silicon atom.

10. A rubber according to claim 6 comprising 10 to 99 parts by weight of said silica and 1 to 80 parts by weight of said silane.

11. A rubber according to claim 6 wherein said silane is selected from the group consisting of 3-mercaptopropyltrimethoxysilane, 3-mercaptopropyltriethoxysilane, bis-(3-triethoxysilylpropyl) tetrasulfide, vinyltrimethoxysilane, vinyltriethoxysilane, vinyl tris-2-(methoxyethoxy)silane, mercaptopropylmethyldiethoxysilane, mercaptopropyldimethylethoxysilane, vinyl methyldimethoxysilane, bis-(3-triethoxysilylpropyl) disulfide, bis-(3-methyldiethoxysilylpropyl) tetrasulfide, bis-(3-triethoxysilylpropyl) monosulfide, bis-(2-triethoxysilylethyltolylene) tetrasulfide, bis-2-(3-triethoxysilyl-5methylphenyl)ethyl trisulfide, bis-tributoxysilylmethyl disulfide, bis-(3-methyldiethoxysilylpropyl) disulfide, thiocyanatopropyltriethoxysilane, and thioureidopropyl-trimethoxysilane.

12. A rubber according to claim 6 wherein an oxide of aluminum is present on the surface of said silica.

13. A rubber according to claim 12 wherein said oxide comprises 0.02 to 1.0% by weight of said silica.

14. A rubber according to claim 12 wherein said silane has the chemical formula:

$$YRSi(R')_n(OR'')_{3-n}$$

wherein R is a divalent alkylene, arylene or aralkylene group of 1 to 20 carbon atoms, a vinyl group or acetylenyl; R' is a monovalent alkyl, aryl or aralkyl group of 1 to 10 carbon atoms; R" is a monovalent alkyl, aryl or aralkyl group of 1 to 12 carbon atoms, wherein one or more of the carbon atoms can be replaced with oxygen, nitrogen or sulfur; Y is an organofunctional group selected from the group consisting of mercapto; sulfide and polysulfide of the structure R'''—$S_x$— where R''' is a monovalent alkyl, aryl or aralkyl group of 1 to 20 carbon atoms or the radical, —RSiR'$_n$(OR")$_{3-n}$, and x is 1 to 9; other bis, tris or higher silanes with sulfur or other heteroatom linkages in the groups between the alkoxy silane groups; vinyl; acetylenyl; carbonyl; amino; alkyl, aralkyl or aryl substituted amino; ureido; thiocyanate; thiourea; epoxy; and hydrogen; and a is an integer and is 0,1 or 2.

15. A rubber according to claim 12 wherein said silane is selected from the group consisting of sulfur-containing silanes with one, two or three alkoxy groups attached to each silicon atom.

16. A rubber according to claim 12 comprising 10 to 99 parts by weight of said silica and 1 to 80 parts by weight of said silane.

17. A rubber according to claim 12 wherein said silane is selected from the group consisting of 3-mercaptopropyltrimethoxysilane, 3-mercaptopropyltriethoxysilane, bis-(3-triethoxysilylpropyl) tetrasulfide, vinyltrimethoxysilane, vinyltriethoxysilane, vinyl tris-2-(methoxyethoxy)silane, mercaptopropylmethyldiethoxysilane, mercaptopropyldimethylethoxysilane, vinyl methyldimethoxysilane, bis-(3-triethoxysilylpropyl) disulfide, bis-(3-methyldiethoxysilylpropyl) tetrasulfide, bis-(3-triethoxysilylpropyl) monosulfide, bis-(2-triethoxysilylethyltolylene) tetrasulfide, bis-2-(3-triethoxysilyl-5-methylphenyl)ethyl trisulfide, bis-tributoxysilylmethyl disulfide, bis-(3-methyldiethoxysilylpropyl) disulfide, thiocyanatopropyltriethoxysilane, and thioureidopropyl-trimethoxysilane.

18. A process for forming an improved elastomer comprising adding to the elastomer a blend of silica and silane, the blend being characterized in that the silica is not reacted to bind or polymerize the silane and over 80% by weight of said silane present can be extracted from said silica when such blend is added to the elastomer.

19. A process according to claim 18 wherein said silica exhibits a differential between its infrared absorbance at 3502 cm$^{-1}$ at 105° C. and at 500° C. of less than 1.3.

20. A process according to claim 19 wherein said differential is greater than 0.9.

21. A process according to claim 18 wherein said silane has the chemical formula:

$$YRSi(R')_n(OR'')_{3-n}$$

wherein R is a divalent alkylene, arylene or aralkylene group of 1 to 20 carbon atoms, a vinyl group of acetylenyl; R' is a monovalent alkyl, aryl or aralkyl group of 1 to 10 carbon atoms; R" is a monovalent alkyl, aryl or aralkyl group of 1 to 12 carbon atoms, wherein one or more of the carbon atoms can be replaced with oxygen, nitrogen or sulfur; Y is an organofunctional group selected from the group consisting of mercapto; sulfide and polysulfide of the structure R'''—$S_x$— where R''' is a monovalent alkyl, aryl or aralkyl group of 1 to 20 carbon atoms or the radical, —RSiR'$_n$(OR")$_{3-n}$, and x is 1 to 9; bis, tris or higher silanes with sulfur or other heteroatom linkages in the groups between the alkoxy silane groups; vinyl; acetylenyl; carbonyl; amino; alkyl, aralkyl or aryl substituted amino; ureido, thiocyanate; thiourea; epoxy; and hydrogen; and a is an integer and is 0, 1 or 2.

22. A process according to claim 21 wherein said silane is selected from the group consisting of sulfur containing silanes with one, two or three alkoxy groups attached to each silicon atom.

23. A process according to claim 18 wherein said blend comprises 10 to 99 parts by weight of said silica and 1 to 80 parts by weight of said silane.

24. A process according to claim 21 wherein said silane is selected from the group consisting of 3-mercaptopropyltrimethoxysilane, 3-mercaptopropyltriethoxysilane, bis-(3-triethoxysilylpropyl) tetrasulfide, vinyltrimethoxysilane, vinyltriethoxylane, vinyl tris-2-(methoxyethoxy)silane, mercaptopropylmethyldiethoxysilane, mercaptopropyldimethylethoxysilane, vinyl methyldimethoxysilane, bis-(3-triethoxysilylpropyl) disulfide, bis-(3-methyldiethoxysilylpropyl) tetrasulfide, bis-(3-triethoxysilylpropyl) monosulfide, bis-(2-triethoxysilylethyltolylene) tetrasulfide, bis-2-(3-triethoxysilyl-5-methylphenyl)ethyl trisulfide, bis-tributoxysilylmethyl disulfide, bis-(3-methyldiethoxysilylpropyl) disulfide, thiocyanatopropyltriethoxysilane, and thioureidopropyl-trimethoxysilane.

25. A process according to claim 19 wherein an oxide of aluminum is present on the surface of said silica.

26. A process according to claim 25 wherein said oxide comprises 0.02 to 1.0% by weight of said silica.

27. A process according to claim 25 wherein said silane has the chemical formula:

$$YRSi(R')_n(OR'')_{3-n}$$

wherein R is a divalent alkylene, arylene or aralkylene group of 1 to 20 carbon atoms, a vinyl group or acetylenyl; R' is a monovalent alkyl, aryl or aralkyl group of 1 to 10 carbon atoms; R" is a monovalent alkyl, aryl or aralkyl group of 1 to 12 carbon atoms, wherein one or more of the carbon atoms can be replaced with oxygen, nitrogen or sulfur; Y is an organofunctional group selected from the group consisting of mercapto; sulfide and polysulfide of the structure R'''—$S_x$— where R''' is a monovalent alkyl, aryl or aralkyl group of 1 to 20 carbon atoms or the radical, —RSiR'$_n$(OR")

$_{3-n}$, and x is 1 to 9; other bis, tris or higher silanes with sulfur or other heteroatom linkages in the groups between the alkoxy silane groups; vinyl; acetylenyl; carbonyl; amino; alkyl, aralkyl or aryl substituted amino; ureido; thiocyanate; thiourea; epoxy; and hydrogen; and a is an integer and is 0, 1 or 2.

28. A process according to claim 27 wherein said silane is selected from the group consisting of sulfur-containing silanes with one, two or three alkoxy groups attached to each silicon atom.

29. A process according to claim 25 wherein said blend comprises 10 to 99 parts by weight of said silica and 1 to 80 parts by weight of said silane.

30. A process according to claim 25 wherein said silane is selected from the group consisting of 3-mercaptopropyltrimethoxysilane, 3-mercaptopropyltriethoxysilane, bis-(3-triethoxysilylpropyl) tetrasulfide, vinyltrimethoxysilane, vinyltriethoxysilane, vinyl tris-2-(methoxyethoxy)silane, mercaptopropylmethyldiethoxysilane, mercaptopropyldimethylethoxysilane, vinyl methyldimethoxysilane, bis-(3-triethoxysilylpropyl) disulfide, bis-(3-methyldiethoxysilylpropyl) tetrasulfide, bis-(3-triethoxysilylpropyl) monosulfide, bis-(2-triethoxysilylethyltolylene) tetrasulfide, bis-2-(3-triethoxysilyl-5-methylphenyl)ethyl trisulfide, bis-tributoxysilylmethyl disulfide, bis-(3-methyldiethoxysilylpropyl) disulfide, thiocyanatopropyltriethoxysilane, and thioureidopropyl-trimethoxysilane.

31. An improved process for the formulation of a rubber-based composition, wherein a masterbatch comprising a silane carried on silica is added to the composition during said formulation, wherein the improvement comprises adding a silane masterbatch which comprises a blend according to claim 1.

32. A process according to claim 31 wherein said silane has the chemical formula:

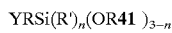
$$YRSi(R')_n(OR41)_{3-n}$$

wherein R is a divalent alkylene, arylene or aralkylene group of 1 to 20 carbon atoms, a vinyl group or acetylenyl; R' is a monovalent alkyl, aryl or aralkyl group of 1 to 10 carbon atoms; R" is a monovalent alkyl, aryl or aralkyl group of 1 to 12 carbon atoms, wherein one or more of the carbon atoms can be replaced with oxygen, nitrogen or sulfur; Y is an organofunctional group selected from the group consisting of mercapto, sulfide and polysulfide of the structure R'''—S$_n$— where R''' is a monovalent alkyl, aryl or aralkyl group of 1 to 20 carbon atoms or the radical, —RSiR'$_n$(OR")$_{3-n}$, and x is 1 to 9; other bis, tris or higher silanes with sulfur or other heteroatom linkages in the groups between the alkoxy silane groups; vinyl acetylenyl; carbonyl; amino; alkyl, aralkyl or aryl substituted amino; ureido; thiocyanate; thiourea; and hydrogen; and a is an integer and is 0, 1 or 2.

33. A process according to claim 31 wherein said blend comprises 10 to 99 parts by weight of said silica and 1 to 80 parts by weight of said silane.

34. A process according to claim 32 wherein said silane is selected from the group consisting of sulfur-containing silanes with one, two or three alkoxy groups attached to each silicon atom.

35. A process according to claim 31 wherein said silane is selected from the group consisting of 3-mercaptopropyltrimethoxysilane, 3-mercaptopropyltriethoxysilane, bis-(3-triethoxysilylpropyl) tetrasulfide, vinyltrimethoxysilane, vinyltriethoxysilane, vinyl tris-2-(methoxyethoxy)silane, mercaptopropylmethyldiethoxysilane, mercaptopropyldimethylethoxysilane, vinyl methyldimethoxysilane, bis-(3-triethoxysilylpropyl) disulfide, bis-(3-methyldiethoxysilylpropyl) tetrasulfide, bis-(3-triethoxysilylpropyl) monosulfide, bis-(2-triethoxysilylethyltolylene) tetrasulfide, bis-2-(3-triethoxysilyl-5-methylphenyl)ethyl trisulfide, bis-tributoxysilylmethyl disulfide, bis-(3-methyldiethoxysilylpropyl) disulfide, thiocyanatopropyltriethoxysilane, and thioureidopropyl-trimethoxysilane.

36. A process according to claim 31 wherein said silica exhibits a differential between its infrared absorbance at 3502 cm$^{-1}$ at 105° C. and at 500° C. of less than 1.3.

37. A process according to claim 36 wherein said differential is greater than 0.9.

38. A process according to claim 36 wherein said silane has the chemical formula:

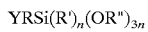
$$YRSi(R')_n(OR")_{3-n}$$

wherein R is a divalent alkylene, arylene or aralkylene group of 1 to 20 carbon atoms, a vinyl group or acetylenyl; R' is a monovalent alkyl, aryl or aralkyl group of 1 to 10 carbon atoms; R" is a monovalent alkyl, aryl or aralkyl group of 1 to 12 carbon atoms, wherein one or more of the carbon atoms can be replaced with oxygen, nitrogen or sulfur; Y is an organofunctional group selected from the group consisting of mercapto, sulfide and polysulfide of the structure R'''—S$_x$— where R'''is a monovalent alkyl, aryl or aralkyl group of 1 to 20 carbon atoms or the radical, —RSiR$^3$$_n$ (OR")$_{3-n}$, and x is 1 to 9; other bis, tris or higher silanes with sulfur or other heteroatom linkages in the groups between the alkoxy silane groups; vinyl; acetylenyl; carbonyl; amino; alkyl, aralkyl or aryl substituted amino; ureido; thiocyanate; thiourea; and hydrogen; and a is an integer and is 0, 1 or 2.

39. A process according to claim 36 wherein said blend comprises 10 to 99 parts by weight of said silica and 1 to 80 parts by weight of said silane.

40. A process according to claim 38 wherein said silane is selected from the group consisting of sulfur-containing silanes with one, two or three alkoxy groups attached to each silicon atom.

41. A process according to claim 36 wherein said silane is selected from the group consisting of 3-mercaptopropyltrimethoxysilane, 3-mercaptopropyltriethoxysilane, bis-(3-triethoxysilylpropyl) tetrasulfide, vinyltrimethoxysilane, vinyltriethoxysilane, vinyl tris-2-(methoxyethoxy)silane, mercaptopropylmethyldiethoxysilane, mercaptopropyldimethylethoxysilane, vinyl methyldimethoxysilane, bis-(3-triethoxysilylpropyl) disulfide, bis-(3-methyldiethoxysilylpropyl)tetrasulfide, bis-(3-triethoxysilylpropyl) monosulfide, bis-(2-triethoxysilylethyltolylene) tetrasulfide, bis-2-(3-triethoxysilyl-5-methylphenyl)ethyl trisulfide, bis-tributoxysilylmethyl disulfide, bis-(3-methyldiethoxysilylpropyl) disulfide, thiocyanatopropyltriethoxysilane, and thioureidopropyl-trimethoxysilane.

42. A process according to claim 36 wherein an oxide of aluminum is present on the surface of said silica.

43. A process according to claim 42 wherein said oxide comprises 0.2 to 1.0% by weight of said silica.

44. A process according to claim 42 wherein said silane has the chemical formula:

$$YRSi(R')_n(OR'')_{3-n}$$

wherein R is a divalent alkylene, arylene or aralkylene group of 1 to 20 carbon atoms, a vinyl group of acetylenyl; R' is a monovalent alkyl, aryl or aralkyl group of 1 to 10 carbon atoms; R" is a monovalent alkyl, aryl or aralkyl group of 1 to 12 carbon atoms, wherein one or more of the carbon atoms can be replaced with oxygen, nitrogen or sulfur; Y is an organofunctional group selected from the group consisting of mercapto, sulfide and polysulfide of the structure R'''—S$_x$— where R''' is a monovalent alkyl, aryl or aralkyl group of 1 to 20 carbon atoms or the radical, —RSiR'$_n$(OR")$_{3-n}$, and x is 1 to 9; other bis, tris or higher silanes with sulfur or other heteroatom linkages in the groups between the alkoxy silane groups; vinyl; acetylenyl; carbonyl; amino; alkyl; aralkyl or aryl substituted amino; ureido; thiocyanate; thiourea; and hydrogen; and a is an integer and is 0, 1 or 2.

45. A process according to claim 42 wherein said blend comprises 10 to 99 parts by weight of said silica and 1 to 80 parts by weight of said silane.

46. A process according to claim 44 wherein said silane is selected from the group consisting of sulfur-containing silanes with one, two or three alkoxy groups attached to each silicon atom.

47. A process according to claim 42 wherein said silane is selected from the group consisting of 3-mercaptopropyltrimethoxysilane, 3-mercaptopropyltriethoxysilane, bis-(3-triethoxysilylpropyl) tetrasulfide, vinyltrimethoxysilane, vinyltriethoxysilane, vinyl tris-2-(methoxyethoxy)silane, mercaptopropylmethyldiethoxysilane, mercaptopropyldimethylethoxysilane, vinyl methyldimethoxysilane, bis-(3-triethoxysilylpropyl) disulfide, bis-(3-methyldiethoxysilylpropyl) tetrasulfide, bis-(3-triethoxysilyl) monosulfide, bis(-2-triethoxysilylethyltolylene) tetrasulfide, bis-2-(3-triethoxysilyl-5-methylphenyl)ethyl trisulfide, bis-tributoxysilylmethyl disulfide, bis-(3-methyldiethoxysilylpropyl) disulfide, thiocyanatopropyltriethoxysilane, and thioureidopropyl-trimethoxysilane.

48. A rubber-based composition produced by the process of claim 31.

49. A rubber-based composition produced by the process of claim 32.

50. A rubber-based composition produced by the process of claim 33.

51. A rubber-based composition produced by the process of claim 34.

52. A rubber-based composition produced by the process of claim 35.

53. A rubber-based composition produced by the process of claim 36.

54. A rubber-based composition produced by the process of claim 37.

55. A rubber-based composition produced by the process of claim 38.

56. A rubber-based composition produced by the process of claim 39.

57. A rubber-based composition produced by the process of claim 40.

58. A rubber-based composition produced by the process of claim 41.

59. A rubber-based composition produced by the process of claim 42.

60. A rubber-based composition produced by the process of claim 43.

61. A rubber-based composition produced by the process of claim 44.

62. A rubber-based composition produced by the process of claim 45.

63. A rubber-based composition produced by the process of claim 46.

64. A rubber-based composition produced by the process of claim 47.

\* \* \* \* \*